United States Patent
Tan et al.

(10) Patent No.: US 10,324,545 B2
(45) Date of Patent: Jun. 18, 2019

(54) OPTICAL NAVIGATION DEVICE AND SYSTEM WITH CHANGEABLE SMOOTHING

(71) Applicant: PixArt Imaging Inc., Hsin-Chu County (TW)

(72) Inventors: Zi-Hao Tan, Penang (MY); Kevin Len-Li Lim, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 15/709,666

(22) Filed: Sep. 20, 2017

(65) Prior Publication Data
US 2019/0087017 A1 Mar. 21, 2019

(51) Int. Cl.
*G06F 3/038* (2013.01)
*G06F 3/03* (2006.01)
*G06T 7/246* (2017.01)
*G06F 3/0354* (2013.01)

(52) U.S. Cl.
CPC ........... *G06F 3/038* (2013.01); *G06F 3/0304* (2013.01); *G06F 3/03543* (2013.01); *G06T 7/248* (2017.01)

(58) Field of Classification Search
None
See application file for complete search history.

(56) References Cited

U.S. PATENT DOCUMENTS

2009/0144621 A1* 6/2009 Sangster ............ G06F 3/03543
715/704
2013/0229514 A1* 9/2013 Huang .................. G01C 11/02
348/140

* cited by examiner

*Primary Examiner* — Duane N Taylor, Jr.
(74) *Attorney, Agent, or Firm* — Hauptman Ham, LLP

(57) ABSTRACT

An optical navigation device including an image sensor, a navigation engine, a smoothing engine and an adjusting interface. The image sensor generates image frames. The navigation engine calculates displacement according to the image frames. The smoothing engine changes a smoothing level for smoothing the calculated displacement according to a trigger signal sent from the adjusting interface.

20 Claims, 4 Drawing Sheets

| Smoothing Level | Tap Number | Latency at 12000Hz(ms) |
|---|---|---|
| 1 | 1 (programmable) | 0.1 |
| 2 | 2 (programmable) | 0.2 |
| 3 | 4 (programmable) | 0.3 |
| 4 | 8 (programmable) | 0.7 |
| 5 | 16 (programmable) | 1.3 |
| 6 | 32 (programmable) | 2.7 |
| 7 | 64 (programmable) | 5.3 |
| 8 | 128 (programmable) | 10.7 |
| 9 | 256 (programmable) | 21.3 |
| 10 | 1024 (programmable) | 42.7 |

| DPI | Smoothing(Taps) | Latency at 12000Hz(ms) |
|---|---|---|
| 50-2000 | 16 (programmable) | 1.3 |
| 2050-3600 | 32 (programmable) | 2.7 |
| 3650-5000 | 64 (programmable) | 5.3 |
| 5050-8200 | 128 (programmable) | 10.7 |

…

OPTICAL NAVIGATION DEVICE AND SYSTEM WITH CHANGEABLE SMOOTHING

BACKGROUND

1. Field of the Disclosure

This disclosure generally relates to an optical navigation device and system, more particularly, to an optical navigation device and system with changeable smoothing level.

2. Description of the Related Art

An interactive image system generally includes a navigation device and an image display device. The navigation device may be a mouse or a pointing device used to estimate a displacement and to transmit the displacement to the image display device. Accordingly, a user can relatively control the motion of a cursor shown on the image display device by using the navigation device.

However, the displacement sent to the image display device from the navigation device is a quantized value, and if this quantized displacement is not smoothed, the cursor shown on the image display device will move in a zigzag motion corresponding to the quantized displacement. Accordingly, when a user wants to perform a drawing operation on the image display device by using the navigation device, it is difficult to draw a graph desired by the user.

However, the improper smoothing parameter can influence the cursor motion outputted by the navigation device. If the smoothing parameter is set too high, it is difficult to real-timely reflect a trace variation detected by the navigation device so that a sharp motion or a small range motion will have a poor performance; on the contrary, if the smoothing parameter is set too low, a smooth motion is not easy to be obtained.

In addition, the selection of the smoothing level is also influenced by the latency due to the nature of the smoothing algorithm. The higher the smoothing level is set, the latency will be more apparent and the user could have poor user experience.

SUMMARY

The present disclosure provides an optical navigation device and system with an adjustment element configured as an interface for a user to adjust the smoothing of the navigation.

The present disclosure provides an optical navigation device including a housing, an adjusting interface, an image sensor and a processor. The adjusting interface is disposed on the housing and configured to generate a trigger signal while being operated. The image sensor is arranged inside the housing and configured to capture image frames. The processor is electrically coupled to the image sensor to receive the image frames, and configured to calculate displacement according to the captured image frames, smooth the calculated displacement according to a first smoothing level before receiving the trigger signal, and smooth the calculated displacement according to a second smoothing level after receiving the trigger signal, wherein the first smoothing level is different from the second smoothing level.

The present disclosure further provides an optical navigation system including an optical navigation device, an adjusting interface and a host. The optical navigation device is configured to capture image frames and output displacement according to the captured image frames. The adjusting interface is configured to generate a trigger signal while being operated. The host is coupled to the optical navigation device to receive the outputted displacement, and configured to smooth the received displacement according to a first smoothing level before receiving the trigger signal, and smooth the received displacement according to a second smoothing level after receiving the trigger signal, wherein the first smoothing level is different from the second smoothing level.

The present disclosure further provides an optical navigation system including an adjusting interface, a host and an optical navigation device. The adjusting interface is configured to generate a trigger signal while being operated. The host is configured to output the trigger signal. The optical navigation device is configured to capture image frames, calculate displacement according to the captured image frames, smooth the calculated displacement according to a first smoothing level before receiving the trigger signal, and smooth the calculated displacement according to a second smoothing level after receiving the trigger signal from the host, wherein the first smoothing level is different from the second smoothing level. The smoothed displacement is then transmitted to the host.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
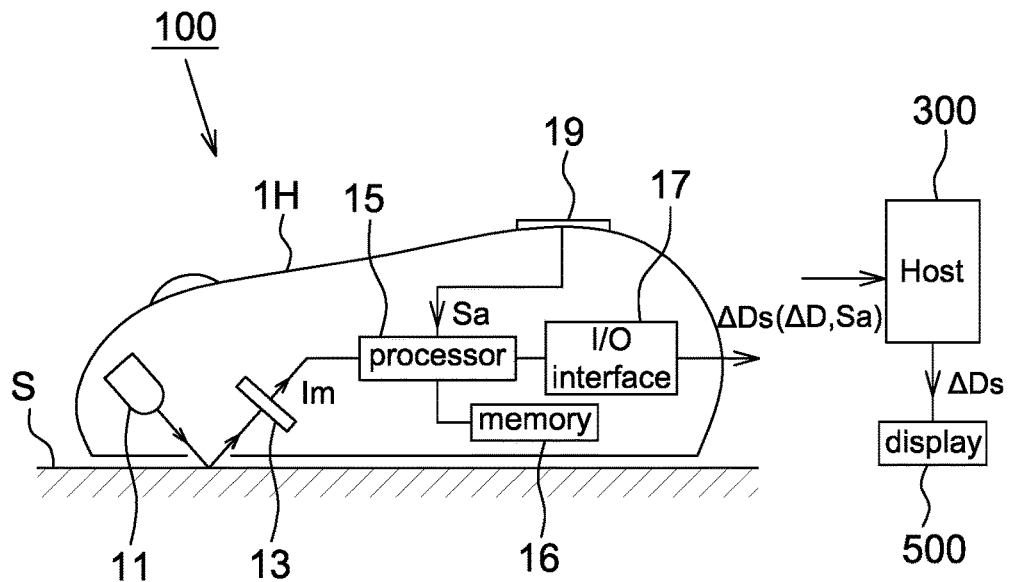
FIG. 1 is a schematic block diagram of an optical navigation system according to one embodiment of the present disclosure.

Referring to FIG. 1, it is a schematic block diagram of an optical navigation system according to one embodiment of the present disclosure. The optical navigation system of the present disclosure includes an optical navigation device 100 and a host 300 communicating to each other. In some embodiments, the optical navigation system further includes a display 500 coupled to the host 300 for showing interactive pictures. The display 500 is a liquid crystal display, a plasma display, an organic light-emitting diode (OLED) display or the like. In some embodiments, the host 300 and the display 500 are formed as one device.

The optical navigation device 100 is, for example, an optical mouse, an optical finger mouse, an optical pointing device or other optical devices capable of detecting movement with respect to a work surface S. The host 300 is, for example, a notebook computer, a tablet computer, a computer host, a game host or other computers capable of controlling at least a cursor moving on the display 500. It is appreciated that the host 300 has other functions in addition to controlling the cursor movement.

The optical navigation system of the present disclosure further includes an adjusting interface 19 configured to generate and output a trigger signal Sa while being operated, wherein said operated is determined according a type of the adjusting interface 19.

For example, the adjusting interface 19 of the present disclosure is a press key, a knob switch, a user interface or other button/switch devices. If the adjusting interface 19 is a press key, e.g., like a left key or right key of a mouse device, said operated is referred to being pressed by the user. If the adjusting interface 19 is a knob switch, said operated is referred to being rotated by the user. If the adjusting interface 19 is a user interface, said operated is referred to being selected on a touch screen or by mouse dragging and button click. More specifically, the adjusting interface 19 is a mechanical device or a software interface shown on the display 500 to be operated by the user.

In FIG. 1, the optical navigation device 100 is shown to include a housing 1H as well as a light source 11, an image sensor 13, a processor 15, a memory 16, and an I/O interface 17 disposed inside the housing 1H. The housing 1H is for being moved with respect to a work surface S, wherein the work surface S is determined according to a type of the optical navigation device 100. For example, if the optical navigation device 100 is an optical mouse, the work surface S is generally referred to a table surface, a paper surface, a mouse pad surface, a glass surface or other surfaces on which the optical mouse is operated. If the optical navigation device 100 is an optical finger mouse, the work surface S is a skin surface, e.g., a finger surface. If the optical navigation device 100 is an optical pointing device, the work surface S is not directly in contact with a surface (e.g., bottom surface) of the optical navigation device 100.

In FIG. 1, the adjusting interface 19 is arranged on a surface of the housing 1H to be easily operated by a user, and electrically coupled to the processor 15 via a signal line to transmit the trigger signal Sa. It should be mentioned that although FIG. 1 shows that the adjusting interface 19 is arranged on a top surface of the housing 1H, it is only intended to illustrate but not to limit the present disclosure. In other embodiments, the adjusting interface 19 is arranged at any surface of the housing 1H without particular limitations.

Figures 5, 6:
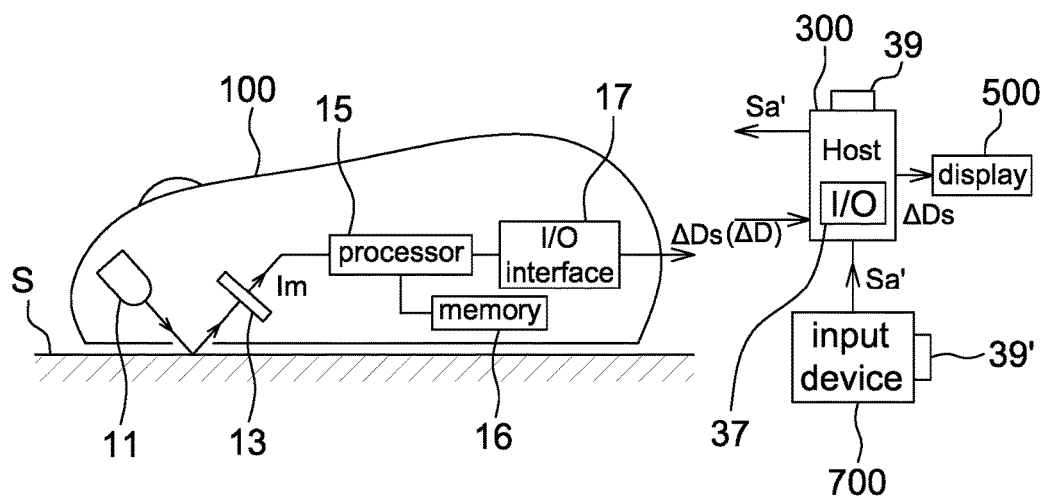
FIG. 5 is a table showing a relationship between a plurality of predetermined DPI and a plurality of predetermined smoothing levels.
FIG. 6 is a schematic block diagram of an optical navigation system according to another embodiment of the present disclosure.

The optical navigation device 100 captures image frames and output displacement with respect to the work surface S according to the captured image frames. In the present disclosure, the displacement outputted, at a fixed or adaptive report rate, by the optical navigation device 100 is smoothed or not smoothed depending on the position of a smoothing engine (described below). The optical navigation device 100 is described herein by an optical mouse as shown in FIGS. 1 and 6 for illustration purposes.

The light source 11 emits an identifiable spectrum such as red light or infrared light, but not limited to, to illuminate the work surface S via an opening at a bottom surface of the housing 1H. Preferably, the identifiable spectrum is not sensed by human eyes. The light source 11 is a coherent light source, a partially coherent light source or a non-coherent light source without particular limitations, e.g., a LED or a laser diode.

The image sensor 13 is a CMOS image sensor, a CCD image sensor or other optical sensors capable of detecting light and output image data. In the embodiment of FIG. 1, the image sensor 13 captures image frames Im of the work surface S. It should be mentioned that although FIG. 1 shows the bright field arrangement of the image sensor 13, the present disclosure is not limited thereto. In other embodiments, the image sensor 13 is arranged as the dark field arrangement.

The processor 15 is a digital signal processor (DSP), a microcontroller (MCU) or an application specific integrated circuit (ASIC). The processor 15 is electrically coupled to the image sensor 15 via a signal line or a bus line to communicate control signals and image signals therebetween. The processor 15 calculates displacement of the optical navigation device 100 with respect to the work surface S according to the image frames Im captured by and received from the image sensor 13. The methods of calculating the displacement according to the captured image frames Im is known to the art, e.g., by comparing two image frames, and thus details thereof are not described herein.

As mentioned above, the optical navigation system has an adjusting interface 19 for changing a smoothing level on the displacement being calculated. In the present disclosure, said smoothing is either performed in the optical navigation device 100 or in the host 300 (described below).

Figure 2:
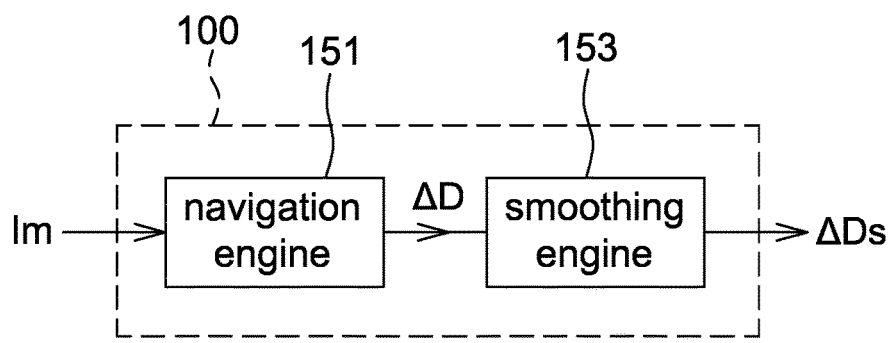
FIG. 2 is a schematic diagram of a processor of an optical navigation device according to one embodiment of the present disclosure.

Referring to FIG. 2, it is a schematic diagram showing that the smoothing is performed in the optical navigation device 100. In this embodiment, the processor 15 includes a navigation engine 151 and a smoothing engine 153. The navigation engine 151 calculates the displacement (not being smoothed) according to the image frames Im sent from the image sensor 13, and said displacement calculation is implemented by hardware, firmware, software or a combination thereof. It should be mentioned that although FIG. 2 shows the navigation engine 151 and the smoothing engine 153 as two function blocks, it is only intended to illustrate but not to limit the present disclosure. It is considered that the functions of the navigation engine 151 and the smoothing engine 153 are both performed by the processor 15.

Referring to FIGS. 1 and 2 again, the processor 15 (or the smoothing engine 153 thereof) receives a trigger signal Sa from the adjusting interface 19 when the adjusting interface 19 is operated. The smoothing engine 153 smooths the calculated displacement according to a first smoothing level before receiving the trigger signal Sa, and smooths the calculated displacement according to a second smoothing level after receiving the trigger signal Sa from the adjusting interface 19, wherein the first smoothing level is different from the second smoothing level. In one embodiment, the trigger signal Sa is only used to alter a smoothing level (or referred to smoothing strength) of the optical navigation device 100.

The smoothing of the calculated displacement is implemented by hardware, firmware, software or a combination thereof. Generally, the smoothing level is adjusted or altered by changing a number of successive image frames Im being used such as averaged, summed, accumulated and/or delayed, but not limited to, in a smoothing algorithm. One of a smoothing algorithm is referred to U.S. patent application Ser. No. 14/605,007, filed on Jan. 26, 2015, assigned to the same assignee of the present disclosure, and the full disclosure of which is incorporated herein by reference. In said smoothing algorithm, if a tab number is altered, the smoothing strength is changeable.

Figures 3, 4:
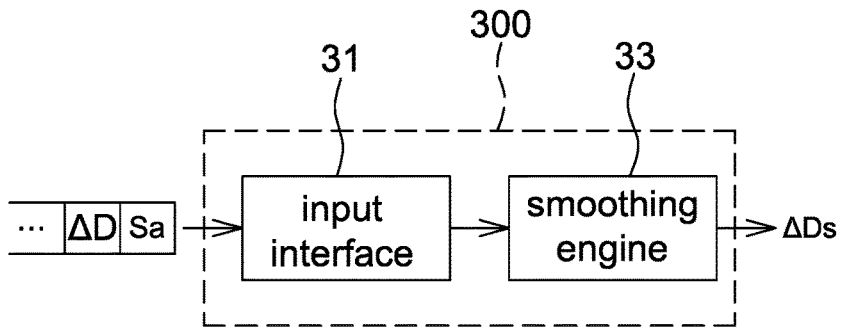
FIG. 3 is a schematic diagram showing a smoothing engine being arranged in a host of an optical navigation system of the present disclosure.
FIG. 4 is a table showing a plurality of predetermined smoothing levels.

In order to allow a user to be able to select different smoothing levels, the memory 16 (e.g., a volatile memory or non-volatile memory) previously stores a plurality of predetermined smoothing levels. For example, FIG. 4 shows one example of a plurality of predetermined smoothing levels previously stored in the memory 16. Although the locus is more smoothed by using a higher tab number (i.e. higher smoothing level), it is seen that the latency is also increased when the higher smoothing level is selected. By using the present disclosure, the user is able to select the desired smoothing strength based on a better user experience, which is affected by the latency. It is appreciated that values in FIG. 4 are only intended to illustrate but not to limit the present disclosure. It is noted that the tab number shown in FIG. 4 is one example of indicating the smoothing level. In other embodiments, the number of image frames being used in a smoothing algorithm is indicated by other smoothing parameters depending on the used smoothing algorithm.

In one embodiment, the processor 15 (or the smoothing engine 153) alters a current smoothing level by one step (e.g., from one of 1-10 levels shown in FIG. 4 to an adjacent one) after receiving the trigger signal Sa from the adjusting interface 19, e.g., the adjusting interface 19 being a press key. In another embodiment, the processor 15 (or the smoothing engine 153) alters a current smoothing level to a selected smoothing level among the predetermined smoothing levels (e.g., among 1-10 levels shown in FIG. 4) when receiving the trigger signal Sa from the adjusting interface 19, e.g., the adjusting interface 19 being a knob switch or user interface.

In some embodiments, the processor 15 alters both a dot-per-inch (dpi) setting and a smoothing level of the optical navigation device 100 according to the trigger signal Sa. For example, when the dot-per-inch setting (or referred to resolution) is altered higher, the smoothing level is altered higher; whereas when the dot-per-inch setting is altered smaller, the smoothing level is altered lower. In this case, the memory 16 previously stores a relationship between a plurality of predetermined dot-per-inch setting and a plurality of predetermined smoothing levels. For example, FIG. 5 shows a relationship between different predetermined DIP with respect to different numbers of taps. As shown in the embodiment of FIG. 4, a number of taps indicates the smoothing level used in the smoothing engine 153. As shown in FIG. 5, the latency is increased with the increment of the DPI and the tap number. A user is able to select (e.g., one step each time or by direct selection) a desired DPI and a corresponding smoothing level based on a better user experience, which is affected by the latency. It is appreciated that values shown in FIG. 5 are only intended to illustrate but not to limit the present disclosure.

In another embodiment, the smoothing is performed in the host 300 instead of in the optical navigation device 100. Referring to FIG. 3, it is a schematic diagram showing a smoothing engine 33 arranged in a host 300 of an optical navigation system according to one embodiment of the present disclosure.

In this embodiment, the host 300 includes an input interface 31 coupled to the I/O interface 17 of the optical navigation device 100. The I/O interface 17 of the optical navigation device 100 and the input interface 31 of the host 300 are the wired or wireless interfaces to communicate to each other. The wired and wireless techniques are well known to the art and thus details thereof are not described herein.

In this embodiment, the optical navigation device 100 calculates the displacement ΔD but does not smooth the calculated displacement ΔD. The I/O interface 17 of the optical navigation device 100 outputs the non-smoothed displacement ΔD and the trigger signal Sa. The host 300 receives the non-smoothed displacement ΔD and the trigger signal Sa via the input interface 31. The host 300 includes a smoothing engine 33, which is substantially identical to the smoothing engine 153 as mentioned above, used to smooth the received displacement ΔD according to a first smoothing level before receiving the trigger signal Sa, and smooth the received displacement ΔD according to a second smoothing level after receiving the trigger signal Sa from the optical navigation device 100, wherein the first smoothing level is different from the second smoothing level. The smoothing engine 33 is integrated in a central processing unit (CPU) or a microcontroller (MCU) of the host 300 and implemented by hardware, software, firmware or a combination thereof. The smoothed displacement ΔDs is then sent to the display 500 for the cursor control.

Similarly, the host 300 (e.g., the CPU or MCU thereof) also alters a dot-per-inch setting and a smoothing level according to the trigger signal Sa. Accordingly, the host 300 includes a memory (e.g., a volatile memory or non-volatile memory) configured to store a relationship between a plurality of predetermined dot-per-inch setting and a plurality of predetermined smoothing levels, e.g., as FIG. 5.

Referring to FIG. 6, it is a schematic block diagram of a navigation system according to another embodiment of the present disclosure. In this embodiment, an adjusting interface 39 is arranged on the host 300 (e.g., on a casing thereof) or an adjusting interface 39' is arranged on another input device 700 coupled to the host 300, wherein said another input device 700 is wired or wirelessly coupled to the host 300. In this embodiment, said another input device 700 is a keyboard, a joystick, a touch device or a graphic interface shown on the display 500. That is, the input device 700 is any known input device as long as it is different from the optical navigation device 100 which is used to transmit the displacement ΔD to the host 300. It is appreciated that although FIG. 6 shows two adjusting interfaces 39 and 39', it is only intended to illustrate but not to limit the present disclosure. Only one will be enough to implement the function of generating a trigger signal Sa'.

In this embodiment, the host 300 includes an I/O interface 37 for communicating with the I/O interface 17 of the optical navigation device 100. Accordingly, when the adjusting interface 39 or 39' is operated, the host 300 (e.g., the CPU or MCU thereof) outputs (via the I/O interface 37) the trigger signal Sa' to the optical navigation device 100.

As mentioned above, the optical navigation device 100 captures image frames Im of a work surface S, e.g., using the image sensor 13, and calculates displacement ΔD with respect to the work surface S according to the captured image frames Im.

Similarly, the smoothing of the present disclosure is performed by the optical navigation device 100 or the host 300. In the aspect of FIG. 2, the optical navigation device 100 (e.g., processor 15) smooth the calculated displacement ΔD according to a first smoothing level before receiving the trigger signal Sa', and smooth the calculated displacement ΔD according to a second smoothing level after receiving the trigger signal Sa' from the host 300, wherein the first smoothing level is different from the second smoothing level. Then, the processor 15 transmits the smoothed displacement ΔDs (via the I/O interface 17) to the host 300 (via the I/O interface 37). The host 300 then sends the smoothed displacement ΔDs to the display 500 for controlling the cursor movement. The I/O interface 37 is similar to the I/O interface 17 and implemented by wired or wireless techniques.

In the aspect of FIG. 3, the optical navigation device 300 transmits the calculated displacement ΔD (via the I/O interface 17) to the host 300 (via the I/O interface 37). The host 300 (e.g., the CPU or MCU thereof) smooth the received displacement ΔD according to a first smoothing level before receiving the trigger signal Sa', and smooth the received displacement ΔD according to a second smoothing level after receiving the trigger signal Sa' from the adjusting interface 39 or 39', wherein the first smoothing level is different from the second smoothing level.

Similarly, in this embodiment, the optical navigation device 100 or the host 300 adjusts the dpi setting and smoothing level simultaneously based on the relationship therebetween, e.g., as FIG. 5, previously stored in the memory. It is appreciated that said memory is arranged in the optical navigation device 100 in the arrangement of FIG. 2 but in the host 300 in the arrangement of FIG. 3.

Figure 7:
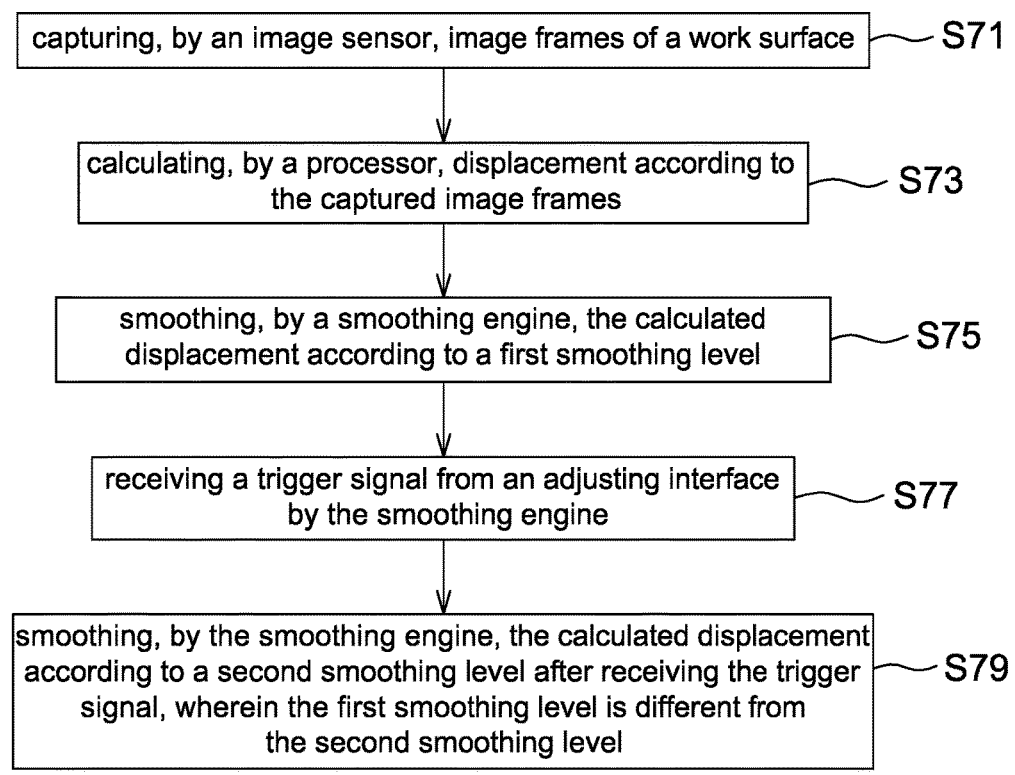
FIG. 7 is a flow chart of an operating method of an optical navigation system according to one embodiment of the present disclosure.

Referring to FIG. 7, it is an operating method of an optical navigation system according to one embodiment of the present disclosure, which is adaptable to both FIGS. 1 and 6 mentioned above. The operating method of this embodiment includes the steps of: capturing, by an image sensor, image frames of a work surface (Step S71); calculating, by a processor, displacement according to the captured image frames (Step S73); smoothing, by a smoothing engine, the calculated displacement according to a first smoothing level (Step S75); receiving a trigger signal from an adjusting interface by the smoothing engine (Step S77); and smoothing, by the smoothing engine, the calculated displacement according to a second smoothing level after receiving the trigger signal, wherein the second smoothing level is different from the first smoothing level (Step S79).

Referring to FIGS. 1-7, details of the operating method of this embodiment are described below.

Steps S31 and S33:

The image sensor 13 of the optical navigation device 100 captures image frames Im of a work surface S at a sampling frequency corresponding to the light emission of the light source 11. The processor 15 calculates displacement ΔD with respect to the work surface S according to the captured image frames Im, e.g., by calculating correlation between two image frames Im.

In some embodiments, the light source 11 emits light alternatively in different brightness, and the processor 15 calculates differential images between image frames Im corresponding to the different brightness to remove noises from ambient light, and thus the image frames for calculating the displacement become differential images. And the processor 15 calculates the displacement ΔD using the differential images, e.g., comparing two differential images.

Step S75:

When the optical navigation device 10 starts to work, a smoothing engine (in the optical navigation device 100 or in the host 300) smooths the calculated displacement ΔD according to a predetermined smoothing level, e.g., a first smoothing level. The predetermined smoothing level is set as one, e.g., a middle one, but not limited to, of a plurality of pre-stored smoothing levels.

Step S77:

Then, the calculated displacement ΔD will be smoothed by a different smoothing level after a trigger signal Sa is generated. As mentioned above, the adjusting interface is either disposed on the optical navigation device 100 as shown in FIG. 1 or disposed on the host 300 or another input device 700 coupled to the host 300 as shown in FIG. 6.

As mentioned above, the smoothing engine is either arranged in the optical navigation device 100 or in the host 300. If the smoothing engine and the adjusting interface are arranged in the same side (i.e. a side of the optical navigation device 100 or the host 300), the smoothing engine directly receives the trigger signal from the adjusting interface. If the smoothing engine and the adjusting interface are arranged at different sides (i.e. one in the optical navigation device 100 and the other in the host 300), the smoothing engine receives the trigger signal through wired or wireless communication between the optical navigation device 100 and the host 300.

Step S79:

Finally, the smoothing engine smooth the calculated displacement ΔD according to a second smoothing level after receiving the trigger signal, wherein the second smoothing level is different from the first smoothing level.

As mentioned above, based on the location of the smoothing engine, the optical navigation device 100 transmits the displacement ΔD (not smoothed) or the smoothed displacement ΔDs to the host 300; and the host 300 (e.g., the CPU or MCU thereof) directly sends the smoothed displacement ΔDs to the display 500 or smooth the non-smoothed displacement ΔD to the smoothed displacement ΔDs at first and then the smoothed displacement ΔDs is sent to the display 500.

It is possible to set the smoothing level, each time the optical navigation device 300 being turned on, at a predetermined smoothing level or at the last smoothing level being selected before the optical navigation device 300 was turned off or entered a sleep mode or a low power mode.

As mentioned above, a smoothing level of the conventional navigation device cannot be altered by a user such that the user may not have a good user experience by using the uncontrollable smoothing. Therefore, the present disclosure further provides an optical navigation device, an optical navigation system (as shown in FIGS. 1 and 6) and an operating method thereof (as shown in FIG. 7) that provide an adjusting interface to be operated by a user to select a desired smoothing level in real time. In addition, as the outputted locus of the optical navigation device is also influenced by the tracking resolution, the adjusting interface is also used to alter the desired dot-per-inch resolution simultaneously.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical navigation device, comprising:
   a housing;
   an adjusting interface disposed on the housing, and configured to generate a trigger signal while being operated;
   an image sensor arranged inside the housing, and configured to capture image frames; and
   a processor electrically coupled to the image sensor, and configured to
      calculate displacement according to the captured image frames, and smooth the calculated displacement according to a first smoothing level before receiving the trigger signal, and smooth the calculated displacement according to a second smoothing level after receiving the trigger signal, wherein the first smoothing level is different from the second smoothing level, wherein the first and second smoothing levels are different numbers of successive image frames being averaged, summed, accumulated or delayed in calculating the displacement.

2. The optical navigation device as claimed in claim 1, wherein the trigger signal is only configured to alter a smoothing level of the optical navigation device.

3. The optical navigation device as claimed in claim 1, wherein the processor is further configured to alter a dot-per-inch setting of the optical navigation device according to the trigger signal.

4. The optical navigation device as claimed in claim 3, wherein when the dot-per-inch setting is altered higher, the smoothing level is altered higher; and when the dot-per-inch setting is altered smaller, the smoothing level is altered lower.

5. The optical navigation device as claimed in claim 1, wherein the adjusting interface is a press key or a knob switch arranged on a surface of the housing, or a user interface.

6. The optical navigation device as claimed in claim 1, further comprising a memory configured to store a plurality of predetermined smoothing levels, and the processor is configured to alter a current smoothing level by one step when receiving the trigger signal.

7. The optical navigation device as claimed in claim 1, further comprising a memory configured to store a plurality of predetermined smoothing levels, and the processor is configured to alter a current smoothing level to a selected smoothing level among the predetermined smoothing levels when receiving the trigger signal.

8. An optical navigation system, comprising:
an optical navigation device configured to capture image frames and output displacement according to the captured image frames;
an adjusting interface configured to generate a trigger signal while being operated; and
a host coupled to the optical navigation device, and configured to
receive the outputted displacement, and
smooth the received displacement according to a first smoothing level before receiving the trigger signal, and smooth the received displacement according to a second smoothing level after receiving the trigger signal, wherein the first smoothing level is different from the second smoothing level,
wherein the first and second smoothing levels are different numbers of successive image frames being averaged, summed, accumulated or delayed in calculating the displacement.

9. The optical navigation system as claimed in claim 8, wherein the adjusting interface is arranged on the optical navigation device.

10. The optical navigation system as claimed in claim 8, wherein the adjusting interface is arranged on the host.

11. The optical navigation system as claimed in claim 8, wherein the adjusting interface is arranged on an input device coupled to the host.

12. The optical navigation system as claimed in claim 8, wherein the adjusting interface is a press key, a knob switch or a user interface.

13. The optical navigation system as claimed in claim 8, wherein the host is further configured to alter a dot-per-inch setting according to the trigger signal.

14. The optical navigation system as claimed in claim 13, wherein the host comprises a memory configured to store a relationship between a plurality of predetermined dot-per-inch setting and a plurality of predetermined smoothing levels.

15. An optical navigation system, comprising:
an adjusting interface configured to generate a trigger signal while being operated;
a host configured to output the trigger signal; and
an optical navigation device configured to
capture image frames,
calculate displacement according to the captured image frames, and
smooth the calculated displacement according to a first smoothing level before receiving the trigger signal, and smooth the calculated displacement according to a second smoothing level after receiving the trigger signal from the host, wherein the first smoothing level is different from the second smoothing level,
wherein the first and second smoothing levels are different numbers of successive image frames being averaged, summed, accumulated or delayed in calculating the displacement.

16. The optical navigation system as claimed in claim 15, wherein the adjusting interface is arranged on a casing of the host.

17. The optical navigation system as claimed in claim 15, wherein the adjusting interface is arranged on an input device coupled to the host.

18. The optical navigation system as claimed in claim 15, wherein the adjusting interface is a press key, a knob switch or a user interface.

19. The optical navigation system as claimed in claim 15, wherein the optical navigation device is further configured to alter a dot-per-inch setting of the optical navigation device according to the trigger signal.

20. The optical navigation system as claimed in claim 19, wherein the optical navigation device comprises a memory configured to store a relationship between a plurality of predetermined dot-per-inch setting and a plurality of predetermined smoothing levels.

* * * * *